US012671777B2

(12) United States Patent
Sasagawa

(10) Patent No.: US 12,671,777 B2
(45) Date of Patent: Jun. 30, 2026

(54) MANAGEMENT APPARATUS, MANAGEMENT METHOD, AND NON-TRANSITORY COMPUTER READABLE MEDIUM

(71) Applicant: FUJIFILM BUSINESS INNOVATION CORP., Tokyo (JP)

(72) Inventor: Hideo Sasagawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,044

(22) Filed: Mar. 3, 2023

(65) Prior Publication Data

US 2024/0098207 A1     Mar. 21, 2024

(30) Foreign Application Priority Data

Sep. 20, 2022     (JP) ................................. 2022-149126

(51) Int. Cl.
*H04N 1/401*          (2006.01)
*H04N 1/10*           (2006.01)

(52) U.S. Cl.
CPC .............. *H04N 1/401* (2013.01); *H04N 1/10* (2013.01); *H04N 2201/0081* (2013.01)

(58) Field of Classification Search
CPC ... H04N 1/401; H04N 1/10; H04N 2201/0081
See application file for complete search history.

(56) References Cited

U.S. PATENT DOCUMENTS

| | | | | | |
|---|---|---|---|---|---|
| 9,501,718 | B1 * | 11/2016 | Samnaik | ................ | H05B 47/19 |
| 2006/0250662 | A1 * | 11/2006 | Heit | ...................... | H04N 1/0032 |
| | | | | | 358/1.15 |
| 2007/0285552 | A1 * | 12/2007 | Kim | ...................... | H04N 25/134 |
| | | | | | 348/335 |
| 2010/0220178 | A1 * | 9/2010 | Takahashi | .............. | H04N 13/10 |
| | | | | | 348/54 |
| 2014/0029067 | A1 * | 1/2014 | Dwivedula | ........ | H04N 1/00363 |
| | | | | | 358/474 |
| 2015/0077826 | A1 * | 3/2015 | Beckman | ............. | H04N 23/687 |
| | | | | | 359/601 |
| 2015/0371576 | A1 * | 12/2015 | Li | ........................... | G09G 3/006 |
| | | | | | 345/87 |
| 2016/0357014 | A1 * | 12/2016 | Beckman | ................... | B60J 3/04 |
| 2017/0075183 | A1 * | 3/2017 | Brown | ................. | G05B 19/048 |
| 2017/0276542 | A1 * | 9/2017 | Klawuhn | .............. | G01J 1/0219 |
| 2018/0017791 | A1 * | 1/2018 | Beckman | ................ | G06F 3/013 |
| 2019/0213778 | A1 * | 7/2019 | Du | ........................... | G06T 15/04 |
| 2019/0332875 | A1 * | 10/2019 | Vallespi-Gonzalez | ....................... | |
| | | | | | G06V 20/584 |
| 2020/0133003 | A1 * | 4/2020 | Wang | ................. | G02B 27/0172 |
| 2020/0193104 | A1 * | 6/2020 | Wang | ................. | G06K 7/10722 |

(Continued)

FOREIGN PATENT DOCUMENTS

JP          2012-151871 A       8/2012

*Primary Examiner* — Kevin Ky
(74) *Attorney, Agent, or Firm* — Oliff PLC

(57)          ABSTRACT
A management apparatus includes a processor configured to cause a camera of an image reading apparatus to capture and read an image of a document bed on which a document is placed, and if a brightness of a read image obtained by reading the document bed differs from a brightness acquired in advance by a threshold value or more, indicate the brightness of the read image in a notification to the image reading apparatus.

16 Claims, 5 Drawing Sheets

(56) References Cited

U.S. PATENT DOCUMENTS

| | | | | |
|---|---|---|---|---|
| 2020/0270525 A1* | 8/2020 | Kobari | ............... | C09K 19/3028 |
| 2020/0409239 A1* | 12/2020 | Ito | ........................ | H04N 23/671 |
| 2021/0011272 A1* | 1/2021 | Ko | ..................... | G02B 27/0025 |
| 2021/0243382 A1* | 8/2021 | Im | ............................ | H04N 9/77 |
| 2022/0253989 A1* | 8/2022 | Tseng | .................. | G06V 10/751 |

* cited by examiner

MANAGEMENT APPARATUS, MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-149126 filed Sep. 20, 2022.

BACKGROUND

(i) Technical Field

The present disclosure relates to a management apparatus, a management method, and a non-transitory computer readable medium.

(ii) Related Art

The imaging processing apparatus disclosed in Japanese Unexamined Patent Application Publication No. 2012-151871 is provided with a document stand on which a document is placed; an image capture unit that captures an image of the document stand; a memory card storing in advance an image of the document stand in a state of a reference luminance distribution; a control unit that obtains a luminance difference image from the image of the document stand captured by the image capture unit and the image of the document stand in the reference state stored in the memory card, and applies a luminance correction, on the basis of the obtained luminance difference image, to at least a document portion in the image of the document stand captured by the image capture unit; and a USB interface that outputs the image obtained by the control unit.

SUMMARY

In the related art, there is an image reading apparatus such as a document camera that uses a camera to read a document placed on a document bed. In such an image reading apparatus, the document is irradiated with indoor light, natural light from outdoors, or the like, and as such, the amount of light irradiating the document varies in the morning or evening, for example. In other words, the amount of light irradiating the document changes due to a change in the environment.

In such an image reading apparatus, an image of a document placed on the document bed is captured, and on the basis of the brightness of a read image obtained by reading the document, a brightness process is performed on the read image. That is, the brightness process that occurs because of a change in the amount of light irradiating the document is performed on the basis of the brightness of the read image obtained by reading the document. For this reason, it takes time for the camera to capture an image of the document placed on the document bed and to output a read image of assured quality.

Aspects of non-limiting embodiments of the present disclosure relate to shortening the time it takes to output a read image of assured quality compared to the case in which a brightness process is performed on a read image on the basis of the brightness of the read image obtained by reading a document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a management apparatus including a processor configured to cause a camera of an image reading apparatus to capture and read an image of a document bed on which a document is placed, and if a brightness of a read image obtained by reading the document bed differs from a brightness acquired in advance by a threshold value or more, indicate the brightness of the read image in a notification to the image reading apparatus.

BRIEF DESCRIPTION OF THE DRAWINGS

Exemplary embodiments of the present disclosure will be described in detail based on the following figures, wherein.

DETAILED DESCRIPTION

Figure 1:
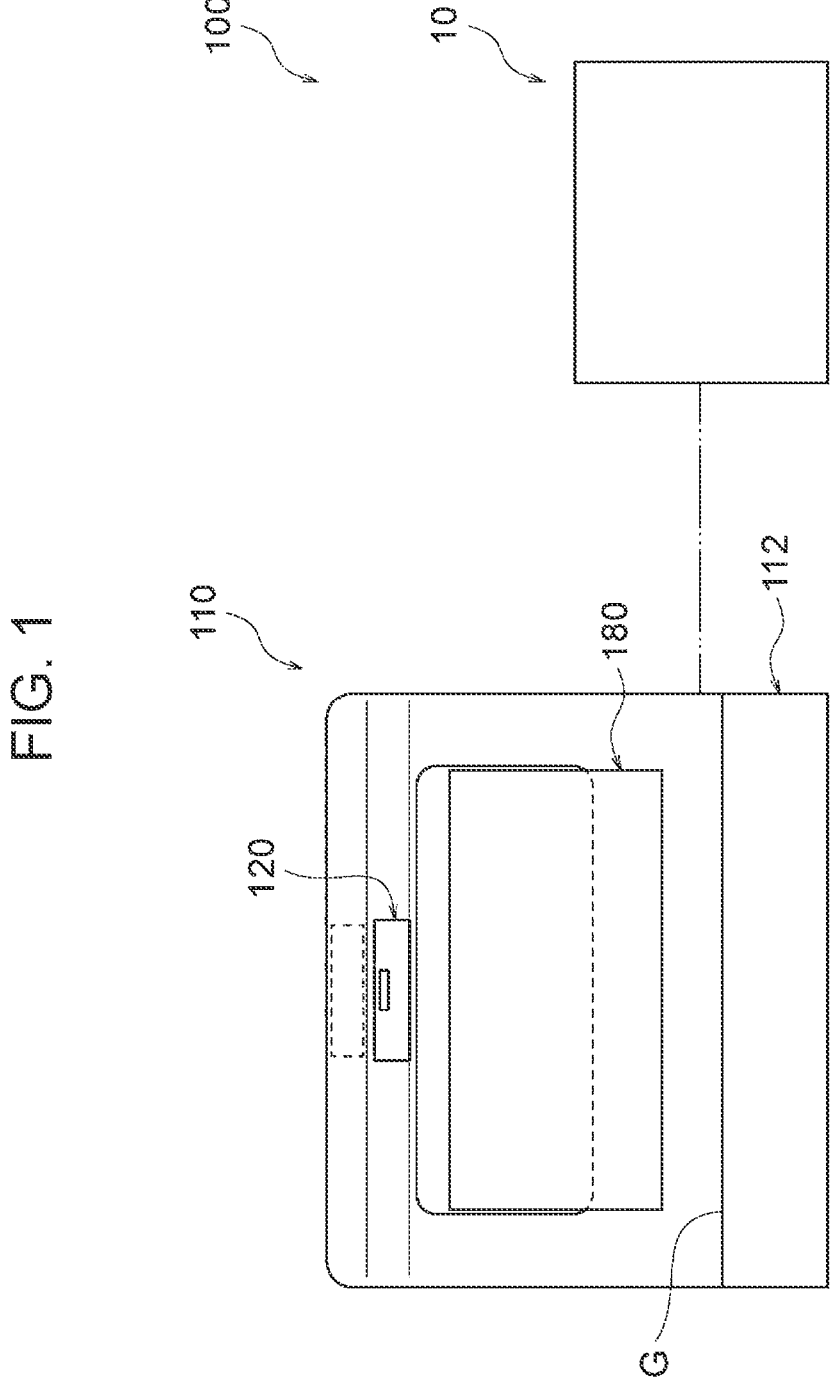
FIG. 1 is a schematic configuration diagram illustrating an image reading system provided with a management apparatus according to an exemplary embodiment of the present disclosure.

An example of a management apparatus, a management method, and a non-transitory computer readable medium according to an exemplary embodiment of the present disclosure will be described according to FIGS. 1 to 5. Note that in the drawings, identical or similar components and portions are denoted with the same reference signs. Furthermore, the dimension ratios in the drawings have been exaggerated for clarity, and may be different from the actual ratios in some cases. Also, in FIGS. 2 and 3, the arrow H indicates the vertical height direction, the arrow W indicates the horizontal width direction, and the arrow D indicates the horizontal depth direction.

First, a schematic configuration of an image reading system 100 to be used with a management apparatus 10 will be described.

(Image Reading System 100)

As illustrated in FIG. 1, the image reading system 100 is provided with an image reading apparatus 110 that reads an image of a document G, and a management apparatus 10 that manages the brightness of the document bed 112 on which the document G is placed and notifies the image reading apparatus 110 of the brightness of a read image of the document bed 112.

(Image Reading Apparatus 110)

Figure 2:
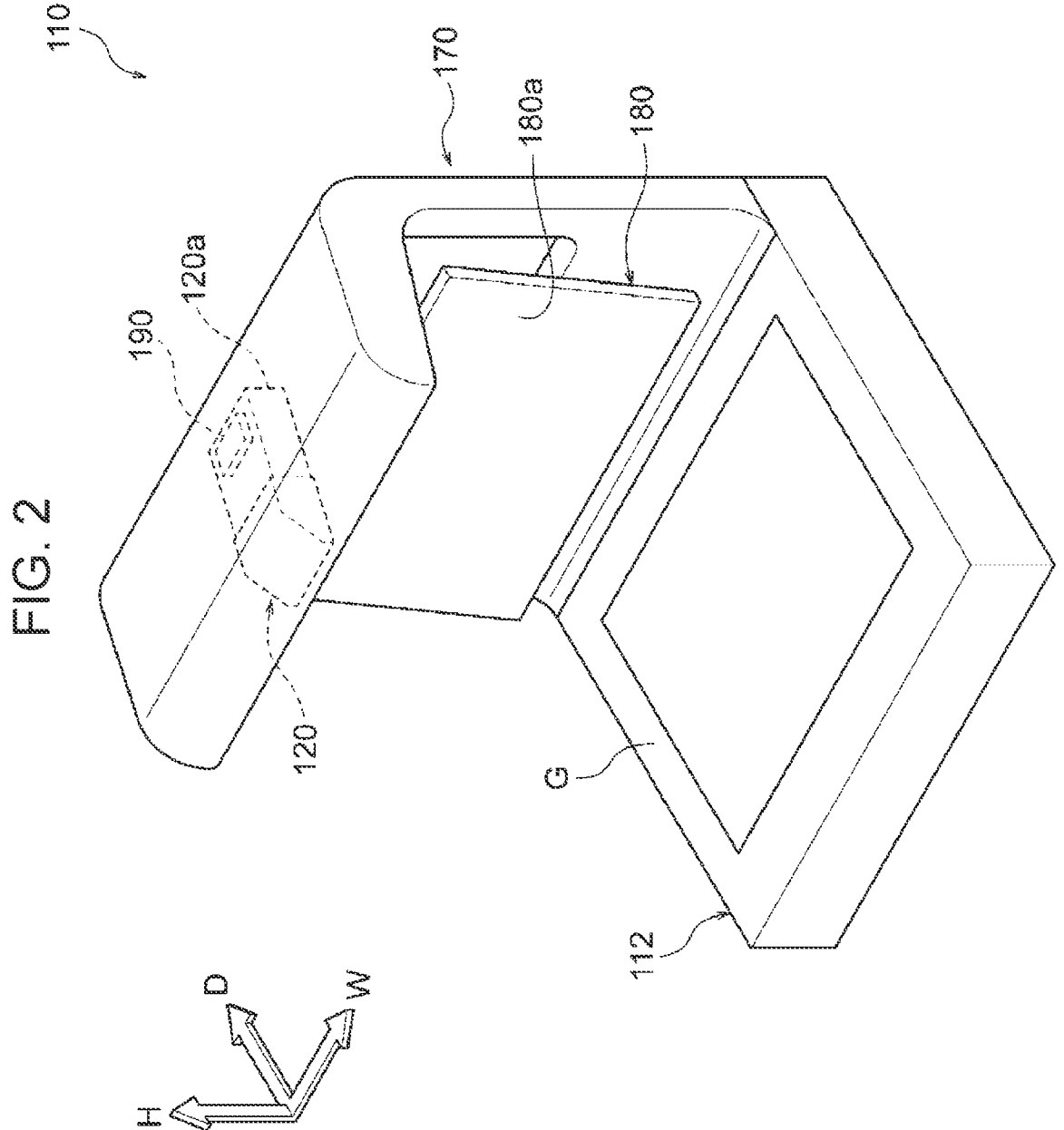
FIG. 2 is a perspective view illustrating an image reading apparatus managed by the management apparatus according to an exemplary embodiment of the present disclosure.

The image reading apparatus 110 is what is called a document camera, and as illustrated in FIG. 2, is provided with the document bed 112 on which the document G is placed and a camera 120 that captures an image of the document G placed on the document bed 112. Furthermore, the image reading apparatus 110 is provided with a support 140 (see FIG. 3) supporting the camera 120, a cover 170 covering the camera 120 and the support 140, and an input device 180 including an operation screen 180*a*.

—Document Bed 112—

As illustrated in FIG. 2, the document bed 112 has a rectangular shape in a planar view. In the present exemplary embodiment, a document G up to A3 size may be placed on the document bed 112 as an example.

—Support 140—

Figure 3:
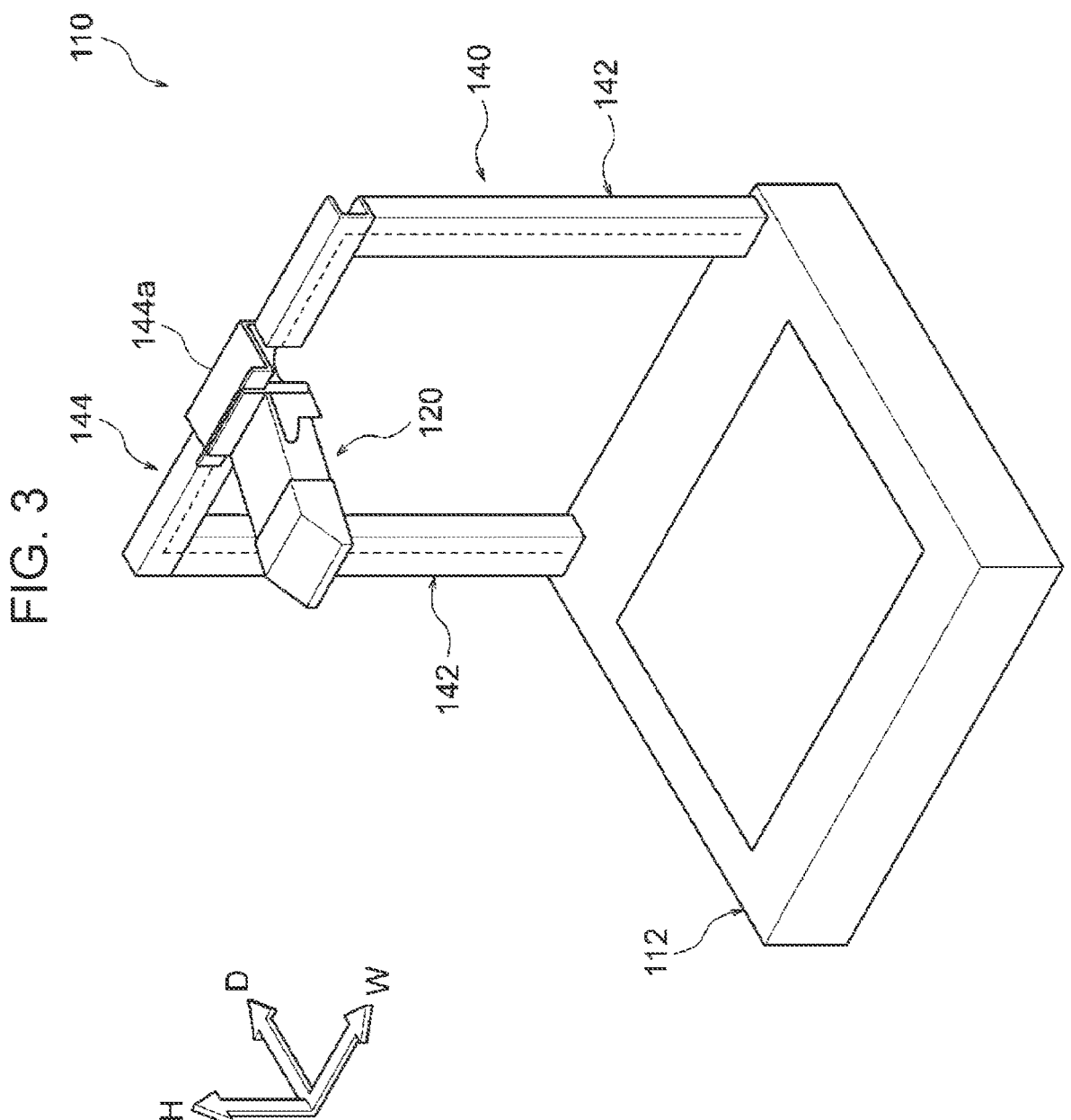
FIG. 3 is a perspective view illustrating a frame and the like of the image reading apparatus managed by the management apparatus according to an exemplary embodiment of the present disclosure.

The support 140 is formed using a metal material, and as illustrated in FIG. 3, is provided with a pair of vertical frames 142 which are located in a far portion of the document bed 112 in the depth direction and which rise up on either side of the document bed 112 in the width direction. Additionally, the support 140 is provided with a horizontal frame 144 spanning the upper parts of the pair of vertical frames 142. Here, the depth direction refers to the direction going toward or away from a user standing in front of the image reading apparatus 110 to use the image reading apparatus 110, with the near side in the depth direction referring to the side close to the user and the far side in the depth direction referred to the side away from the user.

Additionally, a bracket 144*a* is provided in a central portion of the horizontal frame 144 in the width direction, and the camera 120 is attached to the bracket 144*a*.

—Camera 120—

As illustrated in FIG. 2, the camera 120 is disposed above the document bed 112 in the height direction, in a central portion of the document bed 112 in the width direction, and on the far side relative to the center of the document bed 112 in the depth direction.

Also, an image capture optical system is provided inside a housing 120*a* of the camera 120, and a lens for taking in an image to be captured is provided on the bottom surface of the housing 120*a*. Additionally, a harness connected to the camera 120 extends to the input device 180 through the horizontal frame 144 and the vertical frames 142.

—Cover 170—

The cover 170 is formed using a plastic material, and as illustrated in FIG. 2, covers the camera 120 and the support 140 (see FIG. 3). Specifically, the cover 170 covers the camera 120 from above and covers the support 140 from the near side in the depth direction.

—Input Device 180—

As illustrated in FIG. 2, the input device 180 is disposed between the document bed 112 and the camera 120 in the height direction and on the far side of the document bed 112 in the depth direction.

The input device 180 has an operation screen 180*a*. The operation screen 180*a* is what is called a user interface (UI) screen with which the user using the image reading apparatus 110 exchanges information with the image reading apparatus 110. Specifically, the screen is used by the user to give instructions to the image reading apparatus 110 regarding image-forming operations and the like, and is also used to inform the user about the status of operation and settings of the image reading apparatus 110.

In this configuration, if the user places the document G on the document bed 112 and gives an instruction for reading the document G from the operation screen 180*a*, an image of the document G is captured by the camera 120. With this arrangement, the image reading apparatus 110 reads the document G.

—Controller 190—

As illustrated in FIG. 2, the controller 190 is provided inside the camera 120 and includes a brightness adjustment unit that adjusts the brightness of the read image obtained by capturing and reading an image of the document G, a hue adjustment unit that adjusts the hue of the read image, and a saturation adjustment unit that adjusts the saturation of the read image, according to an instruction from the user.

In this configuration, the controller 190 performs a brightness process on the read image of the document G, on the basis of the brightness of the document bed 112 indicated in a notification from the management apparatus 10. Note that the brightness of the document bed 112 indicated in a notification from the management apparatus 10 will be described in detail later.

(Management Apparatus 10)

The management apparatus 10 illustrated in FIG. 1 receives the read image of the document bed 112 captured and read by the camera 120 on a predetermined interval, acquires the brightness of the read image of the document bed 112, and notifies the controller 190 of the image reading apparatus 110 about the acquired brightness. Note that in one example, the brightness is acquired by acquiring RGB values from the read image and converting from RGB to the Lab color space. Also, the process of acquiring the brightness of the read image of the document bed 112 will be described later in conjunction with the action thereof.

—Hardware Configuration of Management Apparatus 10—

Figure 4A:
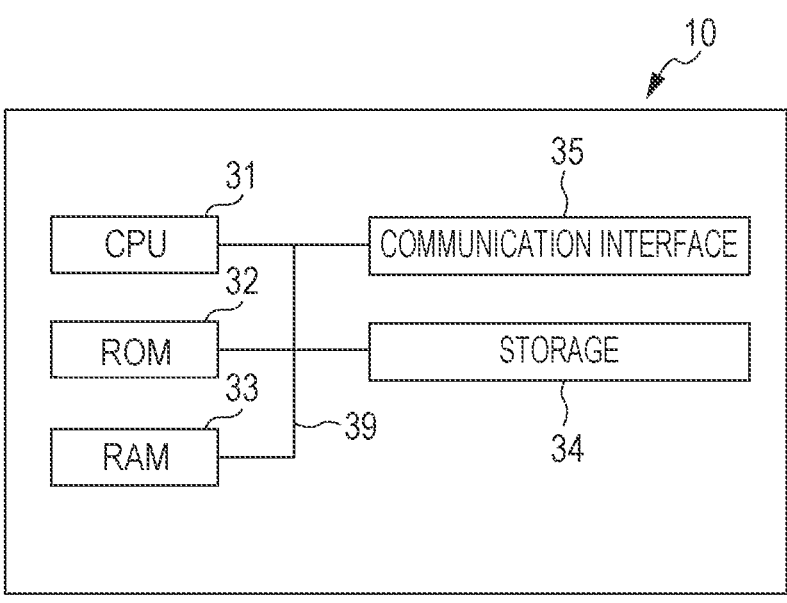
FIGS. 4A and 4B are block diagrams illustrating a hardware configuration and functional configuration, respectively, of a management apparatus according to an exemplary embodiment of the present disclosure.

As illustrated in FIG. 4A, the management apparatus 10 includes a central processing unit (CPU) 31, read-only memory (ROM) 32, random access memory (RAM) 33, storage 34, and a communication interface (I/F) 35. These components are communicably interconnected through a bus 39.

The CPU 31 is a central processing unit that executes various programs and controls each component. In other words, the CPU 31 reads out a program from the ROM 32 or the storage 34, and executes the program by using the RAM 33 as a work area. The CPU 31 controls each component and performs various arithmetic processing in accordance with the program recorded in the ROM 32 or the storage 34. In the present exemplary embodiment, a management program for managing the brightness of the document bed 112 on which the document G is placed is stored in the ROM 32 or the storage 34, for example.

The ROM 32 stores various programs and various data. The RAM 33 temporarily stores programs or data as a work area. The storage 34 includes a hard disk drive (HDD) or a solid-state drive (SSD), and stores various programs, including an operating system, as well as various data. The communication interface 35 is an interface through which the management apparatus 10 communicates with the image reading apparatus 110 and the like, and implements a standard such as Ethernet (registered trademark), FDDI, or Wi-Fi (registered trademark), for example.

When executing the above management program, the management apparatus 10 achieves various functions by using the above hardware resources. A functional configuration achieved by the management apparatus 10 will be described.

—Functional Configuration of Management Apparatus 10—

Figure 4B:
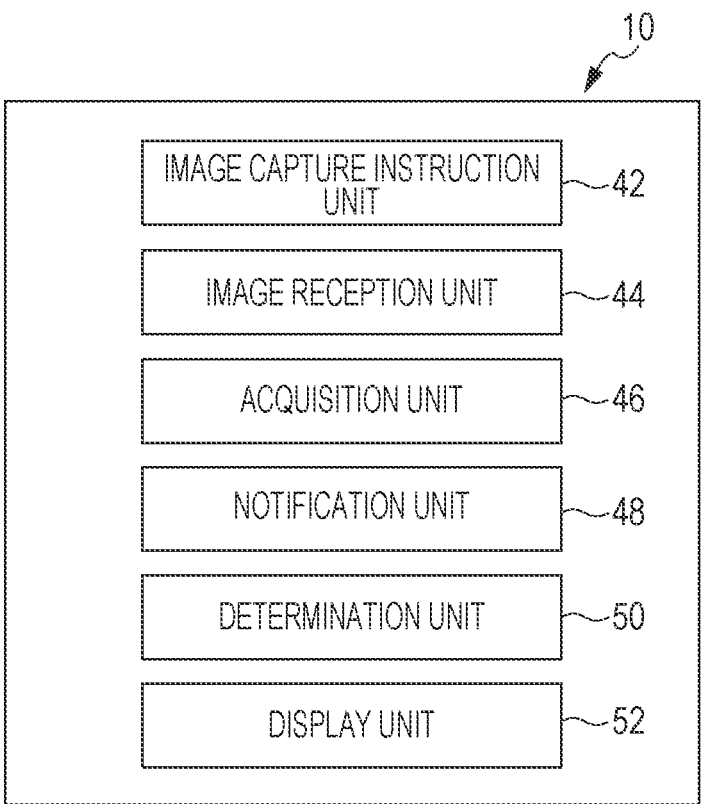

As illustrated in FIG. 4B, the management apparatus 10 includes an image capture instruction unit 42, an image reception unit 44, an acquisition unit 46, a notification unit

48, a determination unit 50, and a display unit 52. These functional components are achieved by having the CPU 31 read out and execute the management program stored in the ROM 32 or the storage 34.

The image capture instruction unit 42 activates the camera 120 of the image reading apparatus 110, causing an image to be captured of the document bed 112 on which the document G is not placed. The image reception unit 44 receives the read image of the document bed 112 captured and read by the camera 120.

The acquisition unit 46 acquires the brightness of the read image of the document bed 112. The notification unit 48 indicates the brightness of the read image of the document bed 112 in a notification to the controller 190 of the image reading apparatus 110. Additionally, although details are described later, the determination unit 50 determines whether the difference between the brightness of the most recent read image of the document bed 112 and the brightness of a previously captured read image of the document bed 112 is equal to or greater than a predetermined threshold value. The display unit 52 displays a change in the amount of light irradiating the document bed 112 on the operation screen 180*a* of the image reading apparatus 110.

(Action of Management Apparatus 10)

Figure 5:
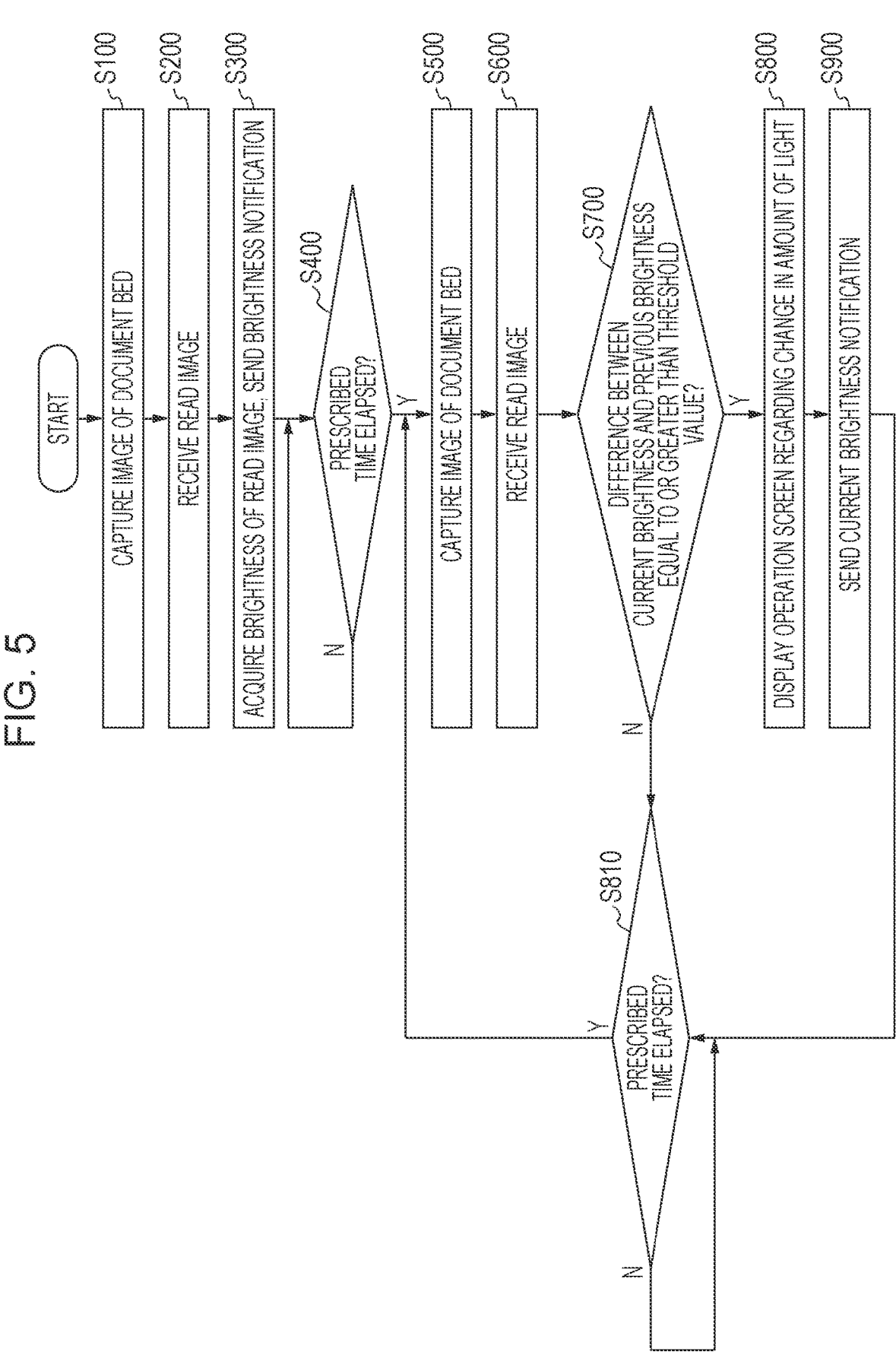
FIG. 5 is a flowchart illustrating a flow of control by a management apparatus according to an exemplary embodiment of the present disclosure.

Next, the action of the management apparatus 10 will be described using the flowchart illustrated in FIG. 5. When the image reading apparatus 110 and the management apparatus 10 are powered on by the user, in step S100 illustrated in FIG. 5, the image capture instruction unit 42 of the management apparatus 10 activates the camera 120 and causes an image to be captured of the document bed 112 on which the document G is not placed.

Additionally, in step S200, the image reception unit 44 receives the read image of the document bed 112 captured and read by the camera 120.

In step S300, the acquisition unit 46 acquires the brightness of the read image of the document bed 112, and the notification unit 48 indicates the acquired brightness in a notification to the controller 190 of the image reading apparatus 110. Here, the brightness of the read image refers to the average of the brightness in portions at the four corners of the document bed 112 in the read image. Additionally, when the image reading apparatus 110 captures and reads the document G placed on the document bed 112, the controller 190 of the image reading apparatus 110 performs a brightness process on the read image of the document G on the basis of the brightness of the read image of the document bed 112 indicated in the notification.

Furthermore, in step S400, if a predetermined, prescribed time elapses from the acquisition of the brightness of the read image by the acquisition unit 46 in step S300, the flow proceeds to step S500. Note that the predetermined, prescribed time is equal to or greater than 0.5 hours and less than or equal to 3 hours, for example, preferably equal to or greater than 1 hour and less than or equal to 2 hours.

The prescribed time may also be shorter in the morning and evening compared to in the daytime. In other words, the prescribed time may be shortened in a time of day when large changes in the amount of light irradiating the document bed 112 occur compared to a time of day when small changes in the amount of light irradiating the document bed 112 occur. For example, the prescribed time may be set to 2 hours in the daytime from 9:00 am until immediately before 4:00 pm, and set to 1 hour in the morning from 4:00 am until immediately before 9:00 am and in the evening from 4:00 pm until immediately before 7:00 pm.

If the prescribed time elapses from the acquisition of the brightness by the acquisition unit 46, in step S500, the image capture instruction unit 42 activates the camera 120 and causes an image to be captured of the document bed 112 on which the document G is not placed.

Additionally, in step S600, the image reception unit 44 receives the read image of the document bed 112 captured and read by the camera 120.

In step S700, the acquisition unit 46 acquires the brightness of the received read image of the document bed 112, and the determination unit 50 compares the brightness of the read image of the document bed 112 (which hereinafter may be referred to as the "current brightness") and the brightness of the read image included in the notification to the controller 190 of the image reading apparatus 110 (which hereinafter may be referred to as the "previous brightness"). Here, the brightness of the read image of the document bed 112 refers to the average of the brightness in portions at the four corners of the rectangular document bed 112, as described in step S300.

The determination unit 50 determines whether the difference between the current brightness and the previous brightness is equal to or greater than a predetermined threshold value. Here, a difference between the current brightness and the previous brightness occurs due to a change in the amount of light irradiating the document bed 112. That is, if there is a large change in the amount of light irradiating the document bed 112, the difference between the current brightness and the previous brightness is large. On the other hand, if there is a small change in the amount of light irradiating the document bed 112, the difference between the current brightness and the previous brightness is small.

If the difference between the current brightness and the previous brightness is equal to or greater than the threshold value, the flow proceeds to step S800, whereas if the difference in brightness is less than the threshold value, the flow proceeds to step S810.

In step S800, the display unit 52 displays, on the operation screen 180*a* of the image reading apparatus 110, an indication that a change has occurred in the amount of light irradiating the document bed 112.

In step S900, the notification unit 48 indicates the current brightness in a notification to the controller 190 of the image reading apparatus 110. Additionally, when the image reading apparatus 110 captures and reads the document G placed on the document bed 112, the controller 190 of the image reading apparatus 110 performs a brightness process on the read image of the document G on the basis of the current brightness indicated in the notification.

When the notification unit 48 indicates the acquired current brightness in a notification to the controller 190 of the image reading apparatus 110, the flow proceeds to step S810. Note that the flow also proceeds to step S810 if the difference between the current brightness and the previous brightness is less than the threshold value in step S700.

In step S810, if the predetermined, prescribed time elapses from the acquisition of the brightness of the read image by the acquisition unit 46 in step S700, the flow proceeds to step S500, and in step S500, as described above, the image capture instruction unit 42 activates the camera 120 and causes an image to be captured of the document bed 112 on which the document G is not placed. In other words, the image capture instruction unit 42 causes the camera 120 to capture an image of the document bed 112 on a predetermined interval. Note that the predetermined, prescribed time is similar to the prescribed time described in step S400.

Also, a power-off causes the series of steps described above to end.

CONCLUSION

As described above, in the management apparatus 10, if the current brightness differs from the previous brightness acquired in advance by the threshold value or more, the current brightness is indicated in a notification to the controller 190 of the image reading apparatus 110. Additionally, when the image reading apparatus 110 captures and reads the document G placed on the document bed 112, the controller 190 of the image reading apparatus 110 performs a brightness process on the read image of the document G on the basis of the current brightness indicated in the notification. With this arrangement, the time it takes to perform the brightness process on the read image of the document G may be shortened compared to the case in which the brightness process is performed on the read image of the document G on the basis of the brightness of the read image obtained by reading the document G, and thus the time it takes to output a read image of assured quality may be shortened.

Also, in the management apparatus 10, the image capture instruction unit 42 causes the camera 120 to capture an image of the document bed 112 at prescribed times. With this arrangement, even if the amount of light irradiating the document bed 112 changes over time, the time it takes to output a read image of assured quality may be shortened compared to the case in which the brightness process is performed on the read image of the document G on the basis of the brightness of the read image obtained by reading the document G.

Also, in the management apparatus 10, the interval of capturing an image of the document bed 112 is shortened in the morning and evening compared to in the daytime. In this way, the interval of capturing an image of the document bed 112 is shortened in the morning and evening when there are large changes in the amount of light per unit time. With this arrangement, a change in the brightness of the document bed 112 may be acquired efficiently compared to the case in which the interval in the morning and evening is the same as the interval in the daytime.

Also, in the management apparatus 10, the average of the brightness of multiple portions of the read image of the document bed 112 is treated as the brightness of the read image. Accordingly, the accuracy of the brightness of the read image of the document bed 112 may be improved compared to the case in which the brightness of a single portion of the read image of the document bed 112 is treated as the brightness of the read image.

Also, in the management apparatus 10, the average of the brightness of portions at the four corners of the document bed 112 in the read image of the document bed 112 is treated as the brightness of the read image. Accordingly, the accuracy of the brightness of the read image of the document bed 112 may be improved compared to the case in which the average of the brightness on both ends of a diagonal across the document bed 112 is treated as the brightness of the read image.

Also, in the management program, the time it takes to perform the brightness process on the read image of the document G may be shortened compared to the case in which the brightness process is performed on the read image on the basis of the brightness of the read image obtained by reading the document G, and thus the time it takes to output a read image of assured quality may be shortened.

The foregoing describes a specific exemplary embodiment of the present disclosure in detail, but the present disclosure is not limited to such an exemplary embodiment, and it is clear to a person skilled in the art that a variety of other embodiments are possible within the scope of the present disclosure. For example, although not explicitly described in step S400 of the exemplary embodiment above, the interval at night from 7:00 pm until immediately before 4:00 am may be set similarly to the interval in the daytime (a 2-hour interval), because the change in the amount of light is small.

Also, although not explicitly described in the exemplary embodiment above, the image reading apparatus 110 may also be provided with an irradiation unit that irradiates with light the document G placed on the document bed 112. In this case, the controller 190 of the image reading apparatus 110 performs the brightness process on the read image obtained by reading the document G with consideration for the brightness indicated in the notification from the management apparatus 10 and for the amount of light emitted by the irradiation unit.

Also, although not explicitly described in the exemplary embodiment above, the image reading apparatus 110 may also be provided with the management apparatus 10.

Also, although not explicitly described in the exemplary embodiment above, the document bed 112 may be white. With this arrangement, the accuracy of the brightness of the document bed 112 is improved compared to the case of a black document bed.

Also, although not explicitly described in the exemplary embodiment above, an image of the document bed 112 may be captured, and only the portions where the brightness is to be read from the read image may be white. With this arrangement, the accuracy of the brightness is improved compared to the black case.

Also, in the exemplary embodiment above, the average of the brightness of the portions at the four corners of the rectangular document bed 112 in the read image is treated as the brightness of the document bed 112, but the brightness of the document bed may also be acquired by taking the average value of the entire document bed, an average value for each region, or sampled values at grid points.

Also, although not explicitly described in the exemplary embodiment above, in step S800, when the change in the amount of light irradiating the document bed 112 is displayed on the operation screen 180*a*, the difference in the brightness may also be displayed and the user may be prompted to make a manual correction, the user may be prompted to manually adjust the brightness/contrast/gamma or the like when inputting an image considering the difference in brightness, the user may be prompted to adjust the saturation of special colors that make red and yellow seem brighter and make blue and green seem darker in the daytime, or the user may be prompted to adjust the saturation of special colors that make blue and green seem brighter and make red and yellow seem darker in the evening.

Also, although not explicitly described in the exemplary embodiment above, the image reading apparatus 110 may also be provided in a printer.

Additionally, the processes executed by causing the CPU 31 to load software (a program) in the exemplary embodiments above may also be executed by any of various types of processors other than a CPU. Examples of the processor in such a case include a programmable logic device (PLD) whose circuit configuration is modifiable after fabrication, such as a field-programmable gate array (FPGA), a dedicated electric circuit which is a processor including a circuit configuration designed for the specific purpose of executing a specific process, such as an application-specific integrated circuit (ASIC), and the like. Also, the brightness process may be executed by one of these various types of processors, or may be executed by a combination of two or more processors of the same or different types (such as multiple FPGAs, or a combination of a CPU and an FPGA, for example). Furthermore, the hardware structure of these various types of processors is more specifically an electric circuit combining circuit elements such as semiconductor devices.

Also, in the exemplary embodiments above, a mode is described in which the program is stored in advance (pre-installed) in the ROM 32 or the storage 34, but the configuration is not limited to the above. The program may also be provided by being recorded onto a recording medium such as a Compact Disc-Read-Only Memory (CD-ROM), a Digital Versatile Disc-Read-Only Memory (DVD-ROM), or Universal Serial Bus (USB) memory. In addition, the program may also be downloaded from an external device over a network.

In the exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A management apparatus including a processor configured to cause a camera of an image reading apparatus to capture and read an image of a document bed on which a document is placed, and if a brightness of a read image obtained by reading the document bed differs from a brightness acquired in advance by a threshold value or more, indicate the brightness of the read image in a notification to the image reading apparatus.

(((2)))

The management apparatus according to (((1))), wherein the processor is configured to cause the camera to capture an image of the document bed on a predetermined interval.

(((3)))

The management apparatus according to (((2))), wherein the processor is configured to shorten the interval of capturing an image of the document bed in a morning and evening compared to in a daytime.

(((4)))

The management apparatus according to any one of (((1))) to (((3))), wherein the processor is configured to treat an average of the brightness of multiple portions in the read image as the brightness of the read image.

(((5)))

The management apparatus according to (((4))), wherein the processor is configured to treat an average of the brightness of portions at four corners of the document bed in the read image as the brightness of the read image.

(((6)))

A management program causing a computer to cause a camera of an image reading apparatus to capture and read an image of a document bed on which a document is placed, and if a brightness of a read image obtained by reading the document bed differs from a brightness acquired in advance by a threshold value or more, indicate the brightness of the read image in a notification to the image reading apparatus.

What is claimed is:

1. A management apparatus comprising:
a processor configured to:
acquire a brightness of a document bed;
cause a camera of an image reading apparatus to capture and read an image of the document bed on which a document is placed;
on the basis of the acquired brightness of the document bed, detect within the read image, a document region corresponding to the document and a background region corresponding to the document bed;
calculate respective brightness values for a plurality of divided regions within the detected document region;
when a difference between a maximum one of the brightness values and a minimum one of the brightness values is greater than or equal to a threshold unevenness value, control the image reading apparatus to perform at least one of: (i) adjusting a reading condition for capturing a subsequent image of the document, and (ii) executing image correction processing on the read image.

2. The management apparatus according to claim 1, wherein the processor is configured to cause the camera to capture an image of the document bed on a predetermined interval.

3. The management apparatus according to claim 2, wherein the processor is configured to shorten the interval of capturing an image of the document bed in a morning and evening compared to in a daytime.

4. The management apparatus according to claim 1, wherein the processor is configured to treat an average of the brightness of multiple portions in the read image as the brightness of the read image.

5. The management apparatus according to claim 4, wherein the processor is configured to treat an average of the brightness of portions at four corners of the document bed in the read image as the brightness of the read image.

6. The management apparatus according to claim 1, wherein the processor is configured to divide the detected document region into the plurality of divided regions arranged in a uniform grid.

7. The management apparatus according to claim 1, wherein the plurality of divided regions comprise regions obtained by dividing the detected document region along both a main scanning direction and a sub-scanning direction.

8. The management apparatus according to claim 1, wherein each of the plurality of divided regions has substantially an equal area within the document region.

9. The management apparatus according to claim 1, wherein the processor is configured to determine a shape of the document region and divide the document region into the plurality of divided regions conforming to the shape.

10. The management apparatus according to claim 1, wherein at least one of the plurality of divided regions is disposed adjacent to an edge portion of the detected document region.

11. The management apparatus according to claim 1, wherein the plurality of divided regions comprise a central region and a plurality of peripheral regions surrounding the central region.

12. The management apparatus according to claim 1, wherein the plurality of divided regions comprise a set of parallel bands extending in a predetermined direction across the detected document region.

13. The management apparatus according to claim 1, wherein the processor is configured to hierarchically divide the detected document region into the plurality of divided regions, each divided region being of progressively smaller size.

14. The management apparatus according to claim 1, wherein the detected document region is divided into a predetermined number of the divided regions selected from the group consisting of four regions, nine regions, and sixteen regions.

15. A management method comprising:

acquiring a brightness of a document bed;

causing a camera of an image reading apparatus to capture and read an image of the document bed on which a document is placed;

on the basis of the acquired brightness of the document bed, detecting within the read image, a document region corresponding to the document and a background region corresponding to the document bed;

calculating respective brightness values for a plurality of divided regions within the detected document region;

when a difference between a maximum one of the brightness values and a minimum one of the brightness values is greater than or equal to a threshold unevenness value, controlling the image reading apparatus to perform at least one of: (i) adjusting a reading condition for capturing a subsequent image of the document, and (ii) executing image correction processing on the read image.

16. A non-transitory computer readable medium storing a program causing a computer to execute a process for management, the process comprising:

acquiring a brightness of a document bed;

causing a camera of an image reading apparatus to capture and read an image of the document bed on which a document is placed;

on the basis of the acquired brightness of the document bed, detecting within the read image, a document region corresponding to the document and a background region corresponding to the document bed;

calculating respective brightness values for a plurality of divided regions within the detected document region;

when a difference between a maximum one of the brightness values and a minimum one of the brightness values is greater than or equal to a threshold unevenness value controlling the image reading apparatus to perform at least one of: (i) adjusting a reading condition for capturing a subsequent image of the document, and (ii) executing image correction processing on the read image.

* * * * *